UNITED STATES PATENT OFFICE 2,503,999

HIGH-PRESSURE SYNTHESIS OF S-TRIAZINES

Theodore Le Sueur Cairns, Newark, Del., Arthur W. Larchar, Mendenhall, Pa., and Blaine Chase McKusick, Wilmington, Del., assignors to E. I. du Pont de Nemours & Company, Wilmington, Del., a corporation of Delaware No Drawing. Application October 14, 1948, Serial No. 54,572

14 Claims. (Cl. 260—248)

This invention relates to s-triazines and to a novel method for their preparation.

The preparation of s-triazines from nitriles containing no hydrogen atoms on alpha-carbon atoms e. g., alpha,alpha-dihalogenated propionitriles and aromatic nitriles, by trimerization of the nitrile in the presence of acid catalysts has been described by various investigators. However, this method is not applicable to nitriles having alpha-hydrogen atoms. Furthermore, the use of basic catalysts for the trimerization of simple aliphatic nitriles containing alpha-hydrogen atoms favors the formation of pyrimidine derivatives instead of s-triazines.

Hence, the only methods hitherto known for preparing alkyl substituted s-triazines having hydrogen atoms on the alpha-carbons of the substituent groups have been indirect and complicated ones. For example, 2,4,6-triethyl-s-triazine has previously been prepared by trimerizing alpha,alpha-dichloropropionitrile in the presence of a strong acid catalyst and subsequently reducing the resulting 2,4,6-tris(1,1-dichloroethyl)-s-triazine with zinc dust to the desired triethyl-s-triazine.

It is an object of this invention to provide a novel method for the preparation of s-triazines. A further object is to provide a method for the preparation of s-triazines from nitriles. A still further object is to provide a method for the preparation of s-triazines from nitriles having hydrogen on the alpha-carbon atom. Another object is to provide a method for directly preparing from nitriles alkyl-substituted s-triazines having hydrogen on the alpha-carbons of the substituent groups. An additional object is to provide new s-triazines. Other objects will appear hereinafter.

These objects are accomplished by the following invention of preparing s-triazines which comprises heating a nitrile in the presence of an alcohol at a temperature of 50° to 250° C. under superpressure, that is at a pressure above 1000 atmospheres. One of the products prepared by this invention is 2,4,6-trimethyl-s-triazine which is produced by this method from acetonitrile. It has now been found that s-triazines can be prepared from nitriles, including those having alpha-hydrogen atoms as well as from those having no alpha-hydrogen atoms, by heating the nitrile in the presence of an alcohol at 50° to 250° C. under a pressure above 1000 atmospheres, until substantial conversion of the nitrile to the s-triazine has occurred.

The formation of the product 2,4,6-trimethyl-s-triazine is illustrated by the following equation:

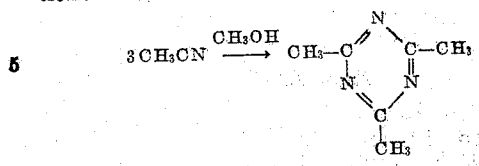

The preferred method for carrying out the process of this invention is as follows: An autoclave capable of withstanding superpressure is charged with a solution comprising a nitrile and an alcohol, e. g., methanol, and heated at 60°–150° C. under a pressure above 3000 atmospheres, preferably at 5000–12,000 atmospheres, until a substantial amount of the nitrile has been converted (trimerized) to a s-triazine. The exact time of heating required depends on the particular nitrile and the particular temperature being used. In general, longer times are required at the lower temperatures in the above-specified range. After completion of the reaction, the reaction mixture is cooled and the s-triazine is isolated by conventional methods such as, for example, by distillation and by sublimation.

Means of producing the extremely high pressures used in the practice of this invention, namely, 1000–12,000 atmospheres, and even higher, have been described in the technical literature. The particular means of producing these superpressures is not a part of this invention. Any suitable apparatus may be employed. The apparatus used in the examples that follow is described in its essentials in "The Physics of High Pressures" by P. W. Bridgman (MacMillan Company), 1931, on pages 41–48.

The invention is further illustrated by the following examples in which the proportions of ingredients are expressed in parts by weight unless otherwise specified.

Example I

A reaction vessel capable of withstanding superpressure is charged with a solution of 14.1 parts of acetonitrile and 14.1 parts of methanol and is heated at 60° C. under a pressure of 6400 to 7500 atmospheres for 67 hours. After cooling and removal from the reaction vessel, the reaction mixture is subjected to distillation at 25°/10 mm. to remove low boiling materials. From the residue, amounting to 2.77 parts, there is obtained by sublimation at 25°/0.3 mm. 1.88 parts of 2,4,6-trimethyl-s-triazine, this corresponding to a conversion of 15%. The triazine has a M. P. of 59–60° C., a B. P. of 155° C. at 760 mm., and its ultraviolet absorption spectrum shows a maximum at 2560 Å., and a specific absorption coefficient, $K_{max.}$, of 6.4. This ultraviolet absorption spectrum is similar to that of the known 2,4,6-triethyl-s-triazine of Example IV. The 2,4,6-trimethyl-s-triazine is very soluble in water and in organic solvents such as for example, ethanol, benzene, chloroform, acetone and ethyl acetate. It can be recrystallized from hexane.

Anal. Calc'd for $C_6H_9N_3$: C, 58.5%; H, 7.4%; N, 34.1%; M. W., 123. Found: C, 58.7%; H, 7.7%; N, 33.55%; M. W. (ebullioscopic in ethanol), 127.

2,4,6-trimethyl-s-triazine is obtained in a 25% conversion by a process similar to that of Example I with the exception that the temperature is held at 100° C. at a pressure of 6900 to 7500 atmospheres for 18 hours. Increasing the pressure to 7000–8500 atmospheres while maintaining the temperature at 100° C. increases the conversion of acetonitrile to the triazine to 39.6%.

*Example II*

A reaction vessel of the type used in Example I is charged with a mixture of 3.24 parts of acetonitrile, 3.24 parts of methanol, and 0.50 part of ammonium acetate and heated for 17.5 hours at 100° C. and 7500 atmospheres pressure. The 2,4,6-trimethyl-s-triazine isolated from this reaction mixture by sublimation at 25° C./0.5 mm. amounts to 1.53 parts, corresponding to 47% conversion.

*Example III*

A mixture of 3.42 parts of acetonitrile, 3.42 parts of methanol, and 0.16 part of 28% aqueous ammonium hydroxide is heated for 17.5 hours at 100° C. at 6400–7500 atmospheres in the apparatus of the preceding examples. After working up the reaction mixture in the same way as in the preceding examples there is obtained 1.69 parts (49% conversion) of 2,4,6-trimethyl-s-triazine.

*Example IV*

A solution consisting of 7.03 parts of propionitrile, and 7.03 parts of methanol is heated in a pressure reactor for 65 hours at 70° C. and 6800–7500 atmospheres pressure. At the end of this period the reaction mixture is cooled and fractionated at reduced pressure. There is thus obtained 2.52 parts (36% conversion) of 2,4,6-triethyl-s-triazine, having a B. P. of 97–98° C. at 26 mm., and 198° C. at 760 mm., a M. P. of 24–25° C. and a refractive index, $n_D^{25}$, of 1.4670. This product is identical in all physical properties, including infrared absorption spectrum, with an authentic sample prepared by the method of Troeger, J. prakt. Chem. 50, 446 (1894) and its melting point is not depressed by admixture with the authentic sample. Its ultraviolet absorption spectrum shows a maximum at 2590 Å. ($K_{max.}$ 4.1).

*Example V*

A pressure reactor is charged with a solution of 3.53 parts of n-valeronitrile and 3.54 parts of methanol and heated for 17 hours at 150° C. and 7000–7500 atmospheres pressure. Distillation of the reaction mixture gives 1.28 parts, 35% conversion, of 2,4,6-tri-n-butyl-s-triazine. This triazine has a B. P. at 0.5 mm. of 85–91° C. and at 760 mm. of 284–287° C., and a refractive index, $n_D^{25}$, of 1.4660. Its ultraviolet absorption spectrum is similar to those of 2,4,6-trimethyl-s-triazine of Example I and 2,4,6-triethyl-s-triazine of Example IV with maximum absorption at 2590 Å ($K_{max.}$ 2.8).

Anal. Calc'd for $C_{15}H_{27}N_3$: C, 72.3%; H, 10.8%; N, 16.9%; M. W., 249. Found: C, 71.7%; H, 10.9%; N, 17.0%; M. W. (ebullioscopic in ethanol), 278, 279.

*Example VI*

A solution of 4.27 parts of alpha,alpha-dichloropropionitrile in an equal weight of methanol is heated in a pressure reactor for 18.5 hours at 100° C. and 6300–7500 atmospheres pressure. After removal of low boiling liquid at 25° C./15 mm. the solid residue from the reaction mixture is sublimed at 110–130° C. at 0.5 mm. There is thus obtained 3.15 parts (74% conversion) of 2,4,6-tris(1,1-dichloroethyl)-s-triazine, having a M. P. of 72–74° C. after recrystallization from methanol. Otto et al., J. prakt. Chem. 36, 78 (1887); 41, 460 (1890), report a M. P. of 73–74° C. for this compound.

*Example VII*

A solution consisting of 3.93 parts of benzonitrile in an equal weight of methanol is heated in a pressure reactor for 18 hours at 100° C. and at 6800–7500 atmospheres pressure. The low boiling material is stripped from the reaction mixture under reduced pressure and there is obtained 3.0 parts (76% conversion) of 2,4,6-triphenyl-s-triazine. After purification by sublimation at 150–175° C./0.5 mm. and recrystallization from toluene, the triphenyl-s-triazine melts at 232–233° C. A mixed melting point of this triazine with an authentic sample prepared by the method of Cook and Jones, J. Chem. Soc. 278 (1941), shows no depression.

*Example VIII*

A solution of 4.02 parts of benzonitrile in 4.03 parts of 2-ethyl-1-hexanol is heated in a pressure reactor for 20 hours at 125° C. under 7500–8000 atmospheres pressure. After cooling, the reaction mixture is diluted with 20 parts of ethyl ether and the insoluble 2,4,6-triphenyl-s-triazine separated by filtration. The yield of crude triazine is 0.90 part, which corresponds to a conversion of 22%. After recrystallization from toluene the triazine melts at 232–233° C. and a mixed melting point with an authentic specimen shows no depression.

*Example IX*

A solution of 3.92 parts of benzonitrile in 3.92 parts of 2-propanol is heated in a pressure reactor for 17 hours at 150° C. under 7500–8000 atmospheres pressure. The reaction mixture is worked up in the manner described in the preceding example and there is obtained 1.80 parts (46% conversion) of 2,4,6-triphenyl-s-triazine, having, after recrystallization from toluene, a melting point of 232–233° C.

The preparation of s-triazines by the process of this invention has been illustrated with particular reference to the trimerization of certain nitriles; however other aliphatic and aromatic nitriles can be converted to s-triazines in a similar manner. For example, the use of n-butyronitrile gives 2,4,6-tri(n-propyl)-s-triazine, the use of isobutyronitrile gives 2,4,6-tri(isopropyl)-s-triazine, the use of capronitrile gives 2,4,6-tri(n-amyl)-s-triazine, p-tolunitrile gives 2,4,6-tri(4-tolyl)-s-triazine, and phenylacetonitrile gives 2,4,6-tribenzyl-s-triazine. Long chain aliphatic nitriles such as stearonitrile, halogenated aliphatic nitriles such as alpha,alpha-dibromopropionitrile, and alpha-chloro-n-butyronitrile, and bifunctional nitriles such as adiponitrile and ethylenecyanhydrin can also be employed. The invention can also be applied to mixtures of nitriles, e. g., a mixture of acetonitrile and propionitrile or a mixture of benzonitrile and propionitrile. The preferred nitriles are mononitriles having the general formula RCN wherein R is an aliphatic, aromatic or aralphatic monovalent hydrocarbon or monovalent halogenated hydrocarbon radical. Especially preferred are the mononitriles of the above formula having at least one alpha-hydrogen atom and in which R is a monovalent, saturated, aliphatic hydrocarbon radical of 1 to 17 carbon atoms.

In addition to the specific alcohols mentioned in the examples, other alcohols can be used in effecting the trimerization of nitriles to s-triazines. Specific examples of alcohols which are operable include methanol, ethanol, 1-propanol, 2-propanol, 1-butanol, 2-butanol, 2-ethyl-1-hexanol and 1-decanol. Higher alcohols can also be used, but the primary and secondary alcohols having from one to eight carbon atoms are preferred since they are more effective and are readily available. Methanol is especially preferred since it produces high conversions of nitriles to the desired s-triazines.

As illustrated by Examples II and III the use of other materials in conjunction with methanol as catalysts can enhance the catalytic activity of the methanol, higher conversion to s-triazine being obtained in shorter times with these additional catalysts than with methanol alone. In fact, such materials as ammonium acetate, ammonium hydroxide, and piperidine also catalyze the formation of s-triazines from nitriles at superpressures in the absence of any alcohol. However, when such materials are used alone as catalysts the trimerization takes place with the formation of more by-products than when an alcohol is used.

The principal advantage of the process of this invention over the prior methods for the preparation of s-triazines is that simple aliphatic nitriles containing hydrogen atoms on the alpha-carbon atoms can be trimerized directly in one step to the desired 2,4,6-trialkyl-s-triazines. Moreover, the process is also useful as a general method for the formation of s-triazines from nitriles irrespective of whether the nitrile contains hydrogen atoms on the alpha-carbon atom or not.

The 2,4,6-trimethyl-s-triazine and other s-triazines obtainable by the process of this invention are useful as chemical intermediates, particularly as dye intermediates and pesticides.

As many apparently widely different embodiments of this invention may be made without departing from the spirit and scope thereof, it is to be understood that this invention is not limited to the specific embodiments thereof except as defined in the appended claims.

We claim:

1. A method of preparing s-triazines which comprises heating a nitrile free from aliphatic unsaturation in the presence of an alcohol at a temperature of 50° to 250° C. and under a pressure above 1000 atmospheres.

2. A method of preparing s-triazines which comprises heating a hydrocarbon mononitrile free from aliphatic unsaturation and having at least one alpha-hydrogen atom in the presence of an alcohol at a temperature of 50° to 250° C. and under a pressure above 1000 atmospheres.

3. A method of preparing s-triazines which comprises heating a hydrocarbon mononitrile free from aliphatic unsaturation and having at least one alpha-hydrogen atom in the presence of methanol at a temperature of 50° to 250° C. and under a pressure above 1000 atmospheres.

4. A method of preparing 2,4,6-trimethyl-s-triazine which comprises heating acetonitrile in the presence of methanol at a temperature of 50° to 250° C. and under a pressure above 1000 atmospheres.

5. A method of preparing s-triazines which comprises heating a hydrocarbon mononitrile free from aliphatic unsaturation in the presence of an alcohol at a temperature of 50° to 250° C. and under a pressure above 1000 atmospheres.

6. A method as set forth in claim 5 in which said pressure is from 5000 to 12,000 atmospheres.

7. A method as set forth in claim 5 in which said alcohol is methanol and said pressure is from 5000 to 12,000 atmospheres.

8. A method of preparing s-triazines which comprises heating a saturated aliphatic hydrocarbon mononitrile having at least one alpha-hydrogen atom in the presence of an alcohol at a temperature of 50° to 250° C. under a pressure above 3000 atmospheres.

9. A method of preparing s-triazines which comprises heating a saturated aliphatic halogenated hydrocarbon mononitrile in the presence of an alcohol at a temperature of 50° to 250° C. and under a pressure above 1000 atmospheres.

10. A method as set forth in claim 9 in which said pressure is from 5000 to 12,000 atmospheres.

11. A method of preparing s-triazines which comprises heating an aryl hydrocarbon mononitrile in the presence of an alcohol at a temperature of 50° to 250° C. and under a pressure above 3000 atmospheres.

12. A method of preparing 2,4,6-triphenyl-s-triazine which comprises heating benzonitrile in the presence of an alcohol at a temperature of 50° to 250° C. and under a pressure above 1000 atmospheres.

13. A method of preparing 2,4,6-tris(1,1-dichloroethyl)-s-triazine which comprises heating alpha,alpha-dichloropropionitrile in the presence of an alcohol at a temperature of 50° to 250° C. and under a pressure above 1000 atmospheres.

14. A method of preparing 2,4,6-trimethyl-s-triazine which comprises heating acetonitrile in the presence of an alcohol at a temperature of 50° to 250° C. and under a pressure above 1000 atmospheres.

THEODORE LE SUEUR CAIRNS.
ARTHUR W. LARCHAR.
BLAINE CHASE McKUSICK.

REFERENCES CITED

The following references are of record in the file of this patent:

UNITED STATES PATENTS

| Number | Name | Date |
|---|---|---|
| 1,989,042 | Kunz | Jan. 22, 1935 |
| 2,395,327 | Hanford | Feb. 19, 1946 |
| 2,439,528 | Roedel | Apr. 13, 1948 |

OTHER REFERENCES

Beilstein, 4th ed., vol. 26, p. 36 (1937).